(12) United States Patent
Chao et al.

(10) Patent No.: US 7,831,459 B2
(45) Date of Patent: Nov. 9, 2010

(54) SYSTEM AND METHOD FOR BALANCING PRODUCTION CAPACITY

(75) Inventors: Jen-Lin Chao, Hsinchu (TW); Chen-Wei Hsu, Hsinchu (TW); Wei-Chuan Huang, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 1612 days.

(21) Appl. No.: 10/811,222

(22) Filed: Mar. 26, 2004

(65) Prior Publication Data

US 2005/0216330 A1  Sep. 29, 2005

(51) Int. Cl.
*G06Q 10/00* (2006.01)

(52) U.S. Cl. ............... 705/8; 705/7; 700/99; 700/100

(58) Field of Classification Search .......... 705/8, 705/7; 700/99, 100
See application file for complete search history.

(56) References Cited

U.S. PATENT DOCUMENTS

| | | | | |
|---|---|---|---|---|
| 4,852,001 | A * | 7/1989 | Tsushima et al. ............ 705/8 |
| 5,721,686 | A * | 2/1998 | Shahraray et al. ........... 700/102 |
| 5,943,484 | A * | 8/1999 | Milne et al. ................. 700/100 |
| 5,971,585 | A * | 10/1999 | Dangat et al. ............... 700/102 |
| 6,701,201 | B2 * | 3/2004 | Hegde et al. ................ 700/107 |
| 6,763,277 | B1 * | 7/2004 | Allen et al. ................. 700/100 |
| 6,898,472 | B2 * | 5/2005 | Crampton et al. ........... 700/97 |
| 6,931,296 | B2 * | 8/2005 | Lin et al. .................... 700/101 |
| 7,003,365 | B1 * | 2/2006 | Yen et al. .................... 700/99 |
| 7,085,730 | B1 * | 8/2006 | Tsao et al. ................... 705/10 |
| 7,460,920 | B1 * | 12/2008 | Qu et al. ..................... 700/101 |
| 7,483,761 | B2 * | 1/2009 | Wang et al. .................. 700/100 |
| 7,522,969 | B2 * | 4/2009 | Duffin et al. ................ 700/112 |
| 2001/0040872 | A1 * | 11/2001 | Haglund ...................... 370/235 |
| 2003/0216952 | A1 * | 11/2003 | Klett et al. ................... 705/8 |
| 2005/0038684 | A1 * | 2/2005 | Wang et al. .................. 705/8 |
| 2005/0038971 | A1 * | 2/2005 | Tsukamoto .................. 711/170 |
| 2005/0216317 | A1 * | 9/2005 | Medellin et al. ............. 705/6 |

OTHER PUBLICATIONS

Catay, "Tool Capacity Planning in Semiconductor Manufacturing," Aug. 2003, Computers & Operations Research, vol. 30, No. 9, pp. 1349-1366.*

Cakanyildirim, M. and Roundy, R. "Evaluation of Capacity Planning Practices for the Semiconductor Industry" Aug. 2002, IEEE Transactions on Semiconductor Manufacturing, vol. 15, No. 3, pp. 331-340.*

* cited by examiner

*Primary Examiner*—Beth V Boswell
*Assistant Examiner*—Tiphany B Dickerson
(74) *Attorney, Agent, or Firm*—Thomas, Kayden, Horstemeyer & Risley

(57) ABSTRACT

A system and method for balancing production capacity between different production technologies. The system includes at least an order management module, a reservation module and a capacity management module. The order management module receives a first order, and generates a dummy order corresponding to the first order. The reservation module reserves a first capacity of a first production technology for the first order and a second capacity of a second production technology for the dummy order. The capacity management module cancels the first order and directs the dummy order to substitute the first order if a second order requesting the first production technology is received, and releases the first capacity to fulfill the second order.

12 Claims, 4 Drawing Sheets

SYSTEM AND METHOD FOR BALANCING PRODUCTION CAPACITY

BACKGROUND

The present invention relates to capacity management and particularly to a system and method that balances production capacity between different production technologies.

In the supply of products, the supply chain performs the functions of material purchasing, transformation of materials into intermediate and finished products, and distribution of finished products to clients. Supply chain management has become important in meeting the goals of reduced inventory, increased productivity, and enhanced competitiveness. Manufacturing and distribution facilities have limited resources and capacity; hence, not every client request may be met, in that some may be promised but unfulfilled, some may receive inadequate supply, and others may be rejected. Consequently, effective management of capacity in supply chain management, without excess capacity loss, has become an important aspect for a product supplier who needs to control manufacture or distribution.

In the supply chain, clients transmit demands that may include a request for a particular quantity of a device design to a supplier by a specific date. The supplier plans its internal or external manufacturing schedule according to these received demands, and allocates capacity for manufacturing products to satisfy each client. After receiving orders corresponding to demands from clients, the supplier starts to manufacture the products.

In some specific industries, such as the semiconductor industry, IC (Integrated Circuit) foundries continuously develop advanced technology to reduce the production unit cost. Therefore, advanced and low level technologies may co-exist in one IC foundry. The IC foundry may have several factories fabricating wafers using different production technologies, such as advanced 0.13 um, 0.15 um, and 0.18 um technologies, and the low level 0.25 um and 0.35 um technologies. The trend and goal of the IC foundry is to replace low level technology with advanced technology; however, the advanced technology of today is the low level technology of tomorrow. That is, the development of production technology never ends.

Some products can be produced by advanced technology or low level technology. However, clients always seek low unit cost to obtain maximum profit. Since the production unit cost of advanced technology is reduced, IC foundry capacity for advanced technology is overloaded and cannot service all clients, and low level technology capacity is not always fully occupied.

SUMMARY

The present invention is proposed to solve the aforementioned issues. It should be noted that the present invention will be applicable to any factory, service supplier and product.

Accordingly, it is an object of the present invention to provide a system and method for balancing capacity between different production technologies.

To achieve the above object, the present invention provides a system and method for balancing production capacity between different production technologies. According to one embodiment of the invention, the system includes at least an order management module, a reservation module and a capacity management module. The order management module receives a first order, and generates a dummy order corresponding to the first order. The reservation module reserves a first capacity of a first production technology for the first order and a second capacity of a second production technology for the dummy order. The first production technology is more advanced than the second production technology. The capacity management module cancels the first order and directs the dummy order to substitute the first order if a second order requesting the first production technology is received, and releases the first capacity to fulfill the second order.

The system further includes a production line manufacturing products of the first order using the second capacity, and manufacturing products of the second order using the first capacity. The system further includes an accounting unit calculating a product discount for the first order.

According to another embodiment of the invention, a method for balancing production capacity between different production technologies is provided. First, a first order is received, and a dummy order corresponding to the first order is generated. Then, a first capacity of a first production technology is reserved for the first order and a second capacity of a second production technology is reserved for the dummy order. The first production technology is more advanced than the second production technology. If a second order requesting the first production technology is received, the first order is canceled and the dummy order is directed to substitute the first order, and the first capacity is released to fulfill the second order.

Further, products of the first order are manufactured using the second capacity, and products of the second order are manufactured using the first capacity. Additionally, a product discount is calculated for the first order.

The above-mentioned method may take the form of program code embodied in tangible media. When the program code is loaded into and executed by a machine, the machine becomes an apparatus for practicing the invention.

BRIEF DESCRIPTION OF THE DRAWINGS

The aforementioned objects, features and advantages of this invention will become apparent by referring to the following detailed description of the preferred embodiment with reference to the accompanying drawings, wherein.

DESCRIPTION

Figure 1:
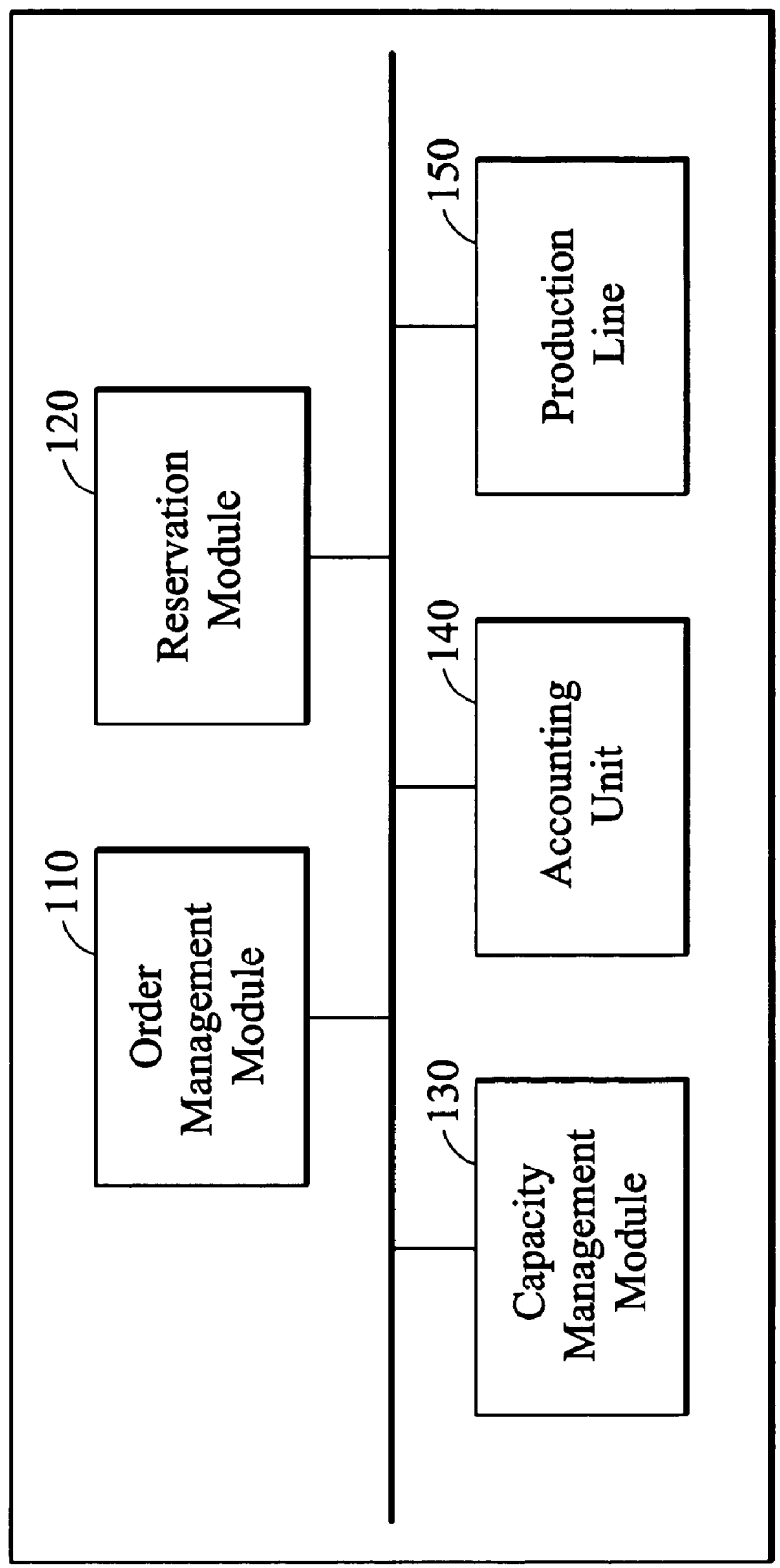
FIG. 1 is a schematic diagram illustrating the system architecture of the system for balancing capacity between different production technologies according to the present invention.

FIG. 1 illustrates the architecture of the system for balancing capacity between different production technologies according to one embodiment of the present invention. The system includes an order management module 110, a reservation module 120, a capacity management module 130, an accounting unit 140 and a production line 150.

The order management module 110 receives orders from clients, in which each of the orders indicates at least a specific production technology for manufacturing corresponding products. The order management module 110 generates a dummy order corresponding to a received order if the received order can be produced by different production technologies. The dummy order is a temporary order and uses the capacity of a lower level production technology than originally indicated (advanced production technology) for the received order. The dummy order will be transformed to a real order if the received order is pushed out from the capacity of the advanced production technology.

The reservation module 120 reserves capacity for orders. In the above case, the reservation module 120 reserves a capacity of the advanced production technology for the received order and another capacity of the low level production technology for the dummy order. The capacity management module 130 performs the method of balancing capacity between different production technologies according to the present invention, and is described in detail later.

The accounting unit 140 generates capacity exchange bills for clients requiring advanced production technology capacity, and calculates product discounts for clients releasing capacity. The production line 150 manufactures products for each client using corresponding reserved capacity when one capacity management cycle is complete.

Figure 2:
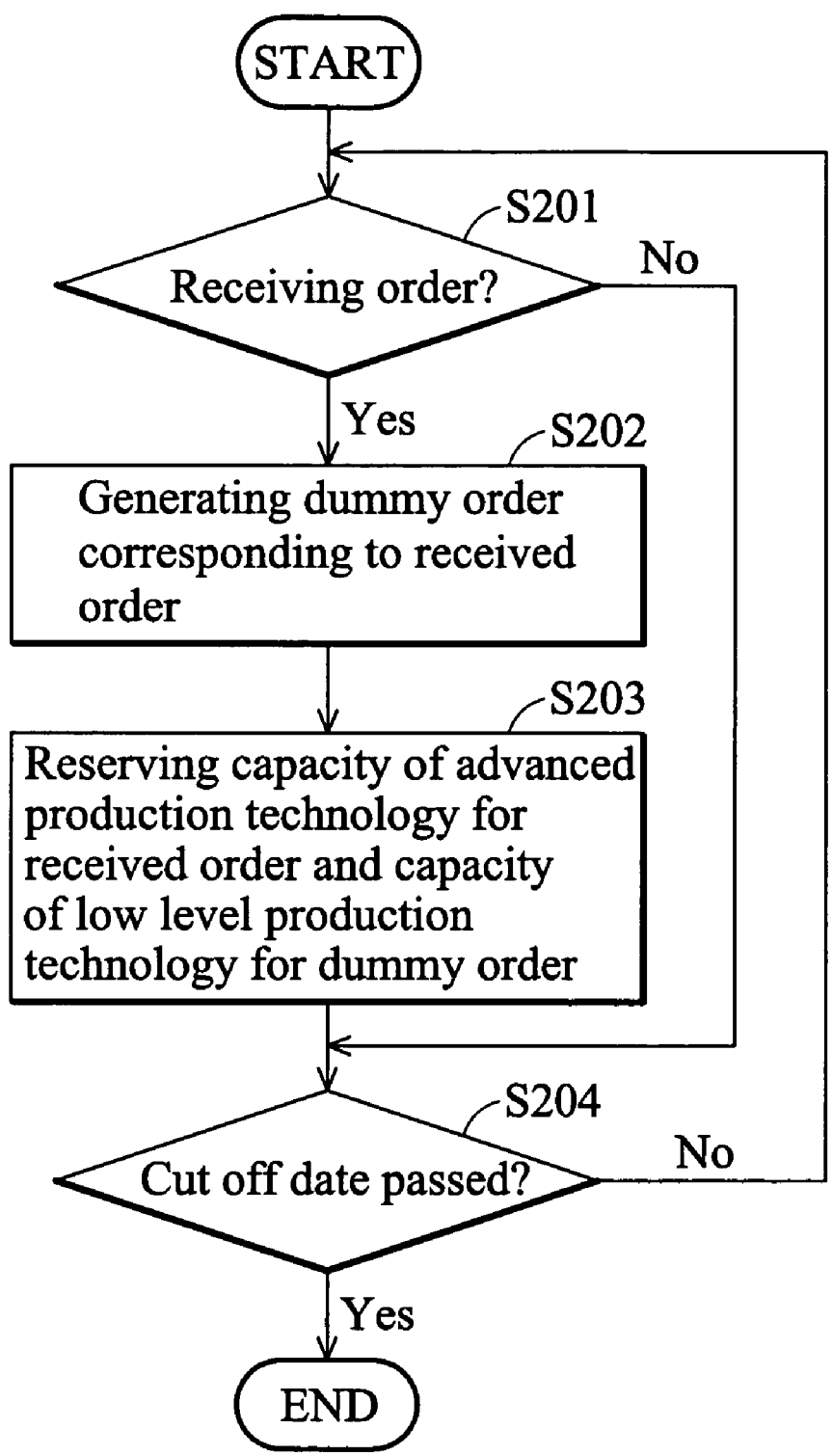
FIG. 2 is a flowchart showing the process of capacity reservation according to the present invention.

FIG. 2 shows the process of capacity reservation according to another embodiment of the present invention. First, in step S201, the order management module 110 checks whether order has been received. If not, the flow goes to step S204.

It is understood that capacity management cycle includes at least three periods for capacity preparation/reservation, operation and production. During the capacity preparation/reservation period, each client transmits its forecast demand plans to the supplier, and the supplier reserves capacity to fulfill its forecast demand plans. During the capacity operation period, the supplier receives actual orders from the client, and allocates appropriate capacity from the reserved capacity. After a cut off date for the capacity management cycle, the remnant capacity of each client is released for other clients, and then the supplier begins manufacturing products for a respective client using its reserved capacity during the production period.

If an order indicating an advanced production technology has been received (Yes in step S201), in step S202, the order management module 110 generates a dummy order indicating a low level production technology corresponding to the received order if the received order can be produced by either the advanced production technology or the low level production technology. In step S203, the reservation module 120 reserves a capacity of the advanced production technology for the received order and another capacity of the low level production technology for the dummy order. Thereafter, in step S204, the order management module 110 checks whether the cut off date for the capacity management cycle has passed. If no, the flow returns to step S201. If yes, the procedure is complete. It should be noted that the received order can be a candidate for push out if the received order can be produced by either the advanced production technology or the low level production technology. Additionally, a planning module (not shown) may plan manufacturing planning schedules (MPS) for both the received order and the dummy order, such that the products corresponding to the received order can be manufactured on schedule if the received order is pushed out from the advanced production technology, and the products are manufactured using the low level production technology.

Figure 3:
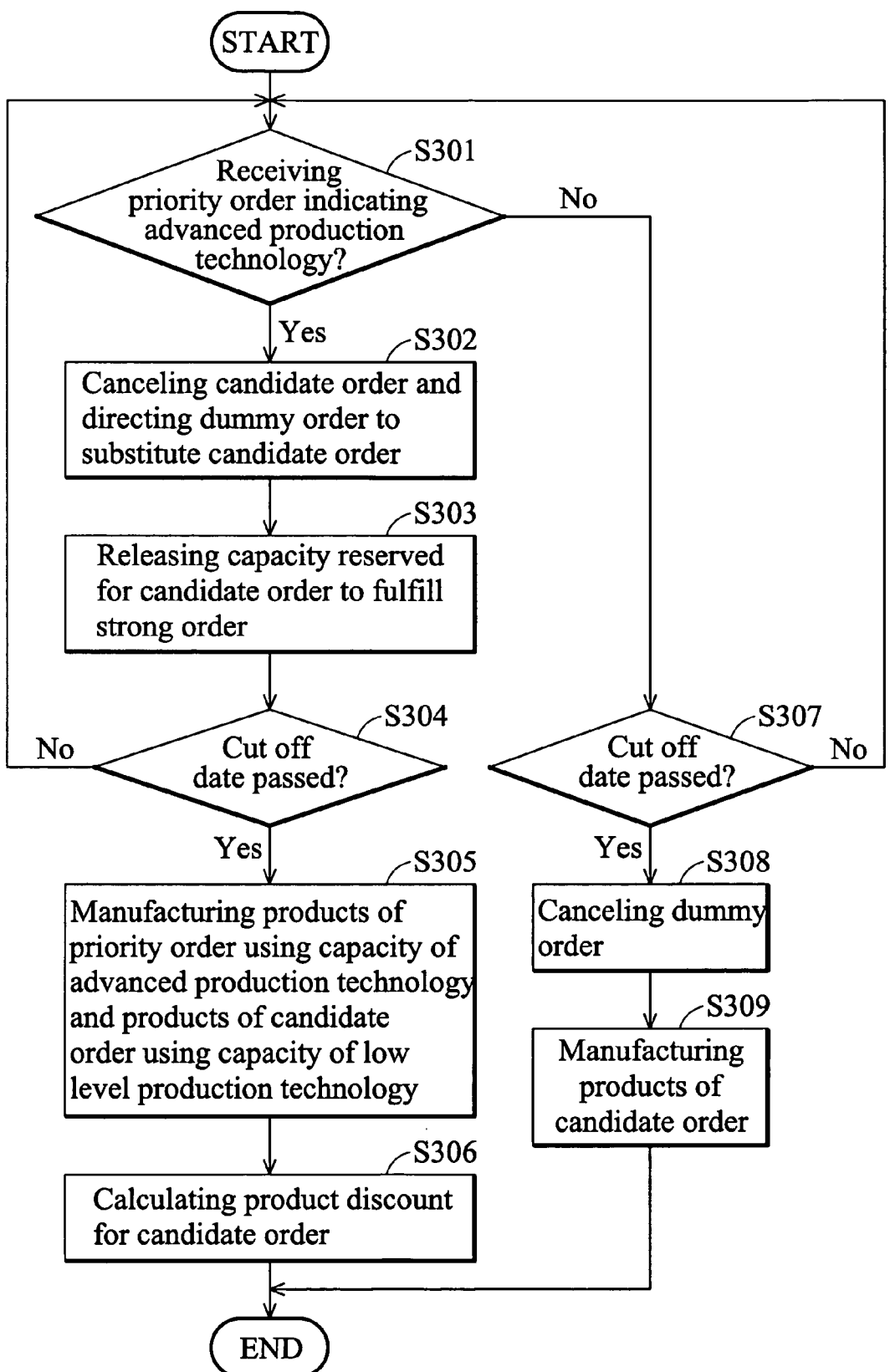
FIG. 3 is a flowchart showing the process of the method of balancing capacity between different production technologies according to the present invention.

FIG. 3 shows the process of the method of balancing capacity between different production technologies according to an embodiment of the present invention. It is understood that the mechanism of balancing capacity between different production technologies functions when the advanced production technology capacity is overloaded, and the low level production technology capacity is under loaded.

In step S301, the order management module 110 checks whether any priority order indicating the advanced production technology has been received. If no priority order is received before the cut off date of the capacity management cycle (No in step S301 and Yes in step S307), in step S308, the order management module 110 cancels the dummy order corresponding to the candidate order and releases the low level production technology capacity reserved for the dummy order, and in step S309, the production line 150 begins manufacturing products of the candidate order using the advanced production technology capacity reserved for the candidate order.

If a priority order indicating advanced production technology has been received (Yes in step S301), in step S302, the capacity management module 130 directs the order management module 110 to cancel the candidate order and transfer the corresponding dummy order into a real order, that is directing the dummy order to substitute the candidate order, and in step S303, the capacity management module 130 directs the reservation module 120 to release the capacity of the advanced production technology reserved for the candidate order to fulfill the priority order. Once the cut off date of the capacity management cycle passes (Yes in step S304), in step S305, the production line 150 begins manufacturing the priority order using the advanced production technology capacity originally reserved for the candidate order, and products of the candidate order using the low level production technology capacity originally reserved for the dummy order. Additionally, in step S306, the accounting unit 140 calculates a product discount for the candidate order. It is noted that the product discount may be preset by the supplier and the clients.

Figure 4:
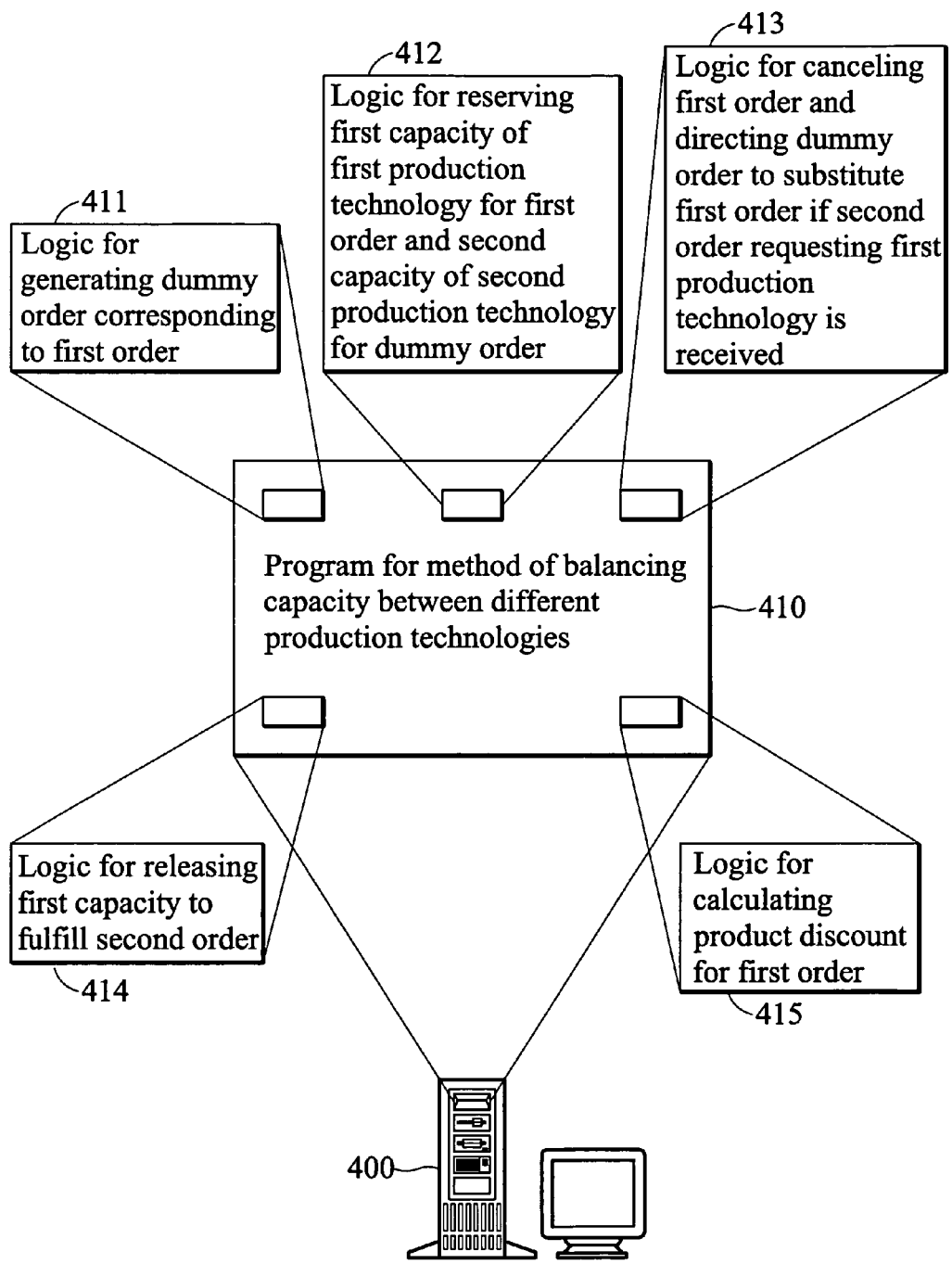
FIG. 4 is a schematic diagram illustrating a storage medium storing a computer program for execution of the method for balancing capacity between different production technologies according to the present invention.

FIG. 4 is a diagram of a storage medium for storing a computer program providing the method of balancing production capacity between different production technologies according to one embodiment of the present invention. The computer program product comprises a storage medium 410 having computer readable program code embodied in the medium for use in a computer system 400, the computer readable program code comprising at least computer readable program code 411 generating a dummy order corresponding to a first order, computer readable program code 412 reserving a first capacity of a first production technology (advanced production technology) for the first order and a second capacity of a second production technology (low level production technology) for the dummy order, computer readable program code 413 canceling the first order and directing the dummy order to substitute the first order if a second order requesting the first production technology is received, computer readable program code 414 releasing the first capacity to fulfill the second order, and computer readable program code 415 calculating a product discount for the first order.

The present invention provides a capacity management mechanism balancing the production capacity load between different production technologies with the same delivery condition for respective clients, thereby reducing the loss of the capacity of low level production technology, and increasing the profit for both supplier and clients.

The method and system of the present invention, or certain aspects or portions thereof, may take the form of program code (i.e., executable instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The method and systems of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to application specific logic circuits.

Although the present invention has been described in its preferred embodiments, it is not intended to limit the invention to the precise embodiments disclosed herein. Those skilled in this technology can still make various alterations and modifications without departing from the scope and spirit of this invention. Therefore, the scope of the present invention shall be defined and protected by the following claims and their equivalents.

What is claimed is:

1. A computer-implemented method for balancing production capacity between different production technologies for use in a computer, wherein the computer is programmed to perform the steps of:
   receiving a first order;
   additionally generating a dummy order corresponding to the first order, wherein the dummy order and the first order are simultaneously existing in the computer;
   reserving a first capacity of a first production technology for the first order and reserving a second capacity of a second production technology for the dummy order, wherein the first production technology and the second production technology are different;
   receiving a second order;
   when the second order requesting the first production technology is received canceling the first order and directing the dummy order to substitute the first order, such that the first order is fulfilled by the second capacity originally reserved for the dummy order; and
   releasing the first capacity originally reserved for the first order to fulfill the second order.

2. The method of claim 1 wherein the second order is received before a cut off date for a capacity management cycle.

3. The method of claim 2 further comprising canceling the dummy order and releasing the second capacity if the second order is not received before the cut off date for the capacity management cycle.

4. The method of claim 1 further comprising manufacturing products of the first order using the second capacity, and manufacturing products of the second order using the first capacity.

5. The method of claim 1 further comprising calculating a product discount for the first order.

6. The method of claim 1 wherein the first production technology is more advanced than the second production technology.

7. A machine-readable storage medium storing a computer program which when executed causes a computer to perform a method for balancing production capacity between different production technologies, the method comprising the steps of:
   receiving a first order;
   additionally generating a dummy order corresponding to the first order, wherein the dummy order and the first order are simultaneously existing in the computer;
   reserving a first capacity of a first production technology for the first order and reserving a second capacity of a second production technology for the dummy order, wherein the first production technology and the second production technology are different;
   receiving a second order;
   canceling the first order and directing the dummy order to substitute the first order if the second order requesting the first production technology is received, such that the first order is fulfilled by the second capacity originally reserved for the dummy order; and
   releasing the first capacity originally reserved for the first order to fulfill the second order.

8. The storage medium of claim 7 wherein the second order is received before a cut off date of a capacity management cycle.

9. The storage medium of claim 8 wherein the method further comprises a step of canceling the dummy order and releasing the second capacity if the second order is not received before the cut off date of the capacity management cycle.

10. The storage medium of claim 7 wherein the method further comprises a step of manufacturing products of the first order using the second capacity, and manufacturing products of the second order using the first capacity.

11. The storage medium of claim 7 wherein the method further comprises a step of calculating a product discount for the first order.

12. The storage medium of claim 7 wherein the first production technology is more advanced than the second production technology.

* * * * *